UNITED STATES PATENT OFFICE.

GEORGE J. THIESSEN, OF TOLEDO, OHIO.

BAIT FOR LURING ANIMALS AND THE LIKE.

1,366,509.  Specification of Letters Patent.  Patented Jan. 25, 1921.

No Drawing.  Application filed October 9, 1919.  Serial No. 329,432.

*To all whom it may concern:*

Be it known that I, GEORGE J. THIESSEN, a citizen of the United States, and a resident of Toledo, in the county of Lucas and State of Ohio, have invented a new and useful Composition of Matter to be Used as Bait for Luring Animals and the like, of which the following is a specification.

One of the objects of my invention is the production of a concentrated compound which emits an odor that is attractive to fur bearing animals and also to noxious rodents, so that it may be used as a bait for either.

Another object of the invention is the production of a compound of this character in which the odoriferous ingredients are so combined with other substances that the compound is not subject to undue evaporation and not readily affected by rain, snow, sleet or frost.

Another object of the invention is the production of a compound possessing the properties above set forth and which at the same time is of such consistency that it may be handled in collapsible metal tubes, as well as in capsules, boxes and the like.

In preparing the composition I prefer to use the ingredients in about the following proportions—viz.

| | |
|---|---|
| Fish oil | 1 gallon. |
| Oil of rhodium | 2 ounces. |
| Oil of anise | 2 ounces. |
| Extract of castor | 2 ounces. |
| Beeswax | 4 pounds. |
| Vaseline | 4 pounds. |

The ingredients are intimately mixed in any suitable manner into a paste of uniform consistency.

Good results may also be obtained when the ingredients are varied within the following limits:

| | |
|---|---|
| Fish oil | ¾ to 2 gallons. |
| Oil of rhodium | 1 to 4 ounces. |
| Oil of anise | 1 to 4 ounces. |
| Extract of castor | 1 to 6 ounces. |
| Beeswax | 1 to 5 pounds. |
| Vaseline | 2 to 6 pounds. |

The anise may in some cases be entirely omitted, though the composition is not then so efficient as a bait for certain species of animals. The omission of the oil of rhodium or the extract of castor and the substitution of other odoriferous substances for those enumerated, as well as the substitution of other waxy substances and oleaginous substances for the beeswax and vaseline, are within the spirit of one phase of my invention, as one of its features is the combination of the odoriferous substances with the base formed of a waxy substance and an oleaginous substance so that the wax forms a stiffener for the oleaginous carrier whereby lasting qualities are secured and the bait is rendered less susceptible to injuries by weather conditions or by submergence in water.

It is to be understood, therefore, that my invention is not limited to the precise ingredients and proportions catalogued above, but includes all such modifications thereof as properly fall within the scope of the claims appended hereto.

Having described my invention, I claim:

1. A composition of matter comprising animal attracting odoriferous substances, oleaginous substances and wax, intimately intermixed for the purpose specified.

2. A composition of matter comprising fish oil, oil of rhodium, extract of castor, beeswax and vaseline, intermixed substantially as described.

3. A composition of matter consisting of one gallon of fish oil, two ounces of oil of rhodium, two ounces of oil of anise, two ounces of extract of castor, four pounds of beeswax, and four pounds of vaseline, substantially as described.

GEORGE J. THIESSEN.

Witnesses:
C. R. SAYRE,
H. C. WHITEHORNE.